US 9,266,243 B2

(12) United States Patent
Swartz et al.

(10) Patent No.: US 9,266,243 B2
(45) Date of Patent: Feb. 23, 2016

(54) ARM LOCKING SYSTEM

(71) Applicant: Ergotron, Inc., St. Paul, MN (US)

(72) Inventors: Nicholas Robert Swartz, Minneapolis, MN (US); Shaun C. Lindblad, Lino Lakes, MN (US)

(73) Assignee: Ergotron, Inc., St. Paul, MN (US)

(*) Notice: Subject to any disclaimer, the term of this patent is extended or adjusted under 35 U.S.C. 154(b) by 0 days.

(21) Appl. No.: 14/281,321

(22) Filed: May 19, 2014

(65) Prior Publication Data

US 2014/0366674 A1 Dec. 18, 2014

Related U.S. Application Data

(60) Provisional application No. 61/835,302, filed on Jun. 14, 2013.

(51) Int. Cl.
*F16M 13/00* (2006.01)
*B25J 18/00* (2006.01)
(Continued)

(52) U.S. Cl.
CPC .............. *B25J 18/00* (2013.01); *F16M 11/10* (2013.01); *F16M 11/2014* (2013.01); *F16M 11/2092* (2013.01); *F16M 11/24* (2013.01);
(Continued)

(58) Field of Classification Search
CPC .............. F16M 11/10; F16M 11/2014; F16M 11/2092; F16M 11/24; F16M 11/42; F16M 13/02; F16M 13/022; F16M 2200/024; F16M 2200/028; F16M 2200/044; F16M 2200/063; Y10T 74/20329; B25J 18/00

USPC ........ 248/276.1, 274.1, 281.11, 284.1, 282.1, 248/917, 919, 585; 361/679.21, 679.22, 361/679.06
See application file for complete search history.

(56) References Cited

U.S. PATENT DOCUMENTS 4,682,749 A * 7/1987 Strater ...................... 248/284.1
5,779,209 A    7/1998 Rello
(Continued)

FOREIGN PATENT DOCUMENTS

JP  09-196055 A   7/1997
JP  2009-125371 A   6/2009
(Continued)

OTHER PUBLICATIONS

"International Application Serial No. PCT/US2014/042338, International Search Report mailed Jan. 15, 2015", 5 pgs.
(Continued)

*Primary Examiner* — Anita M King
(74) *Attorney, Agent, or Firm* — Schwegman Lundberg & Woessner, P.A.

(57) ABSTRACT

In one example, an arm assembly with an arm locking system is described that can include a base to position the arm on a support structure, an extension arm having first and second ends, the first end of the extension arm connected to the support structure or base at a first joint proximate the first end. The system can include a lift arm having third and fourth ends, the third end connected to the extension arm at a second joint proximate the third end, the fourth end being height adjustable relative to the base. The system can include a first lock engageable to selectively prevent movement about the first joint, a second lock engageable to selectively prevent movement about the second joint, and a third lock engageable to selectively prevent a height of the fourth end from being adjusted relative to the base or extension arm.

20 Claims, 11 Drawing Sheets

(51) Int. Cl.
*F16M 11/10* (2006.01)
*F16M 11/20* (2006.01)
*F16M 11/24* (2006.01)
*F16M 11/42* (2006.01)
*F16M 13/02* (2006.01)

(52) U.S. Cl.
CPC .............. *F16M 11/42* (2013.01); *F16M 13/02* (2013.01); *F16M 13/022* (2013.01); *F16M 2200/024* (2013.01); *F16M 2200/028* (2013.01); *F16M 2200/044* (2013.01); *F16M 2200/063* (2013.01); *Y10S 901/27* (2013.01); *Y10T 74/20329* (2015.01)

(56) References Cited

U.S. PATENT DOCUMENTS

| | | | |
|---|---|---|---|
| 6,669,639 | B1 | 12/2003 | Miller et al. |
| 7,775,485 | B2 | 8/2010 | Asai et al. |
| 8,056,874 | B2 * | 11/2011 | Goodwin et al. .......... 248/276.1 |
| 8,359,982 | B2 * | 1/2013 | Lebel et al. ..................... 108/44 |
| 8,733,722 | B2 * | 5/2014 | Hung ......................... 248/276.1 |
| 8,794,579 | B2 * | 8/2014 | Sturman et al. ............. 248/284.1 |
| 2008/0067302 | A1 | 3/2008 | Olivera et al. |
| 2008/0132786 | A1 | 6/2008 | Asai et al. |
| 2008/0234577 | A1 | 9/2008 | Murkowski et al. |
| 2010/0327129 | A1 * | 12/2010 | Chen ............................ 248/121 |
| 2011/0201927 | A1 | 8/2011 | Hayakawa et al. |
| 2012/0182709 | A1 | 7/2012 | Asai et al. |
| 2012/0235000 | A1 * | 9/2012 | Borloz et al. ............... 248/284.1 |

FOREIGN PATENT DOCUMENTS

| | | |
|---|---|---|
| WO | WO-2005/074806 A1 | 8/2005 |
| WO | WO-2014/010764 A1 | 1/2014 |
| WO | WO-2014/201375 A2 | 12/2014 |

OTHER PUBLICATIONS

"International Application Serial No. PCT/US2014/042338, Written Opinion mailed Jan. 15, 2015", 6 pgs.

* cited by examiner

ARM LOCKING SYSTEM

CLAIM OF PRIORITY

This patent application claims the benefit of U.S. Provisional Patent Application Ser. No. 61/835,302, titled "ARM LOCKING SYSTEM AND METHOD" to Swartz et al. and filed on Jun. 14, 2013 (Attorney Docket No. 5983.060PRV), which is hereby incorporated by reference herein in its entirety.

TECHNICAL FIELD

This disclosure generally relates to systems and methods for mounting electronic devices.

BACKGROUND

Electronic devices, such as flat panel televisions and tablets, are generally devices having a height dimension and a width dimension much greater than a depth dimension. They are often mounted to support structures by positionable arms for viewing.

SUMMARY

Examples of the invention include an arm assembly with an arm locking system. In some examples, the arm locking system is operable to selectively lock one or more joints of the arm assembly. Such an arm locking system is useful for restricting movement of an electronic device attached to the arm assembly about selected axes. Examples of the invention also include methods of using arm assemblies with arm locking systems.

To further illustrate the arm locking system and method disclosed herein, a non-limiting list of examples is provided here:

In Example 1, an arm assembly with an arm locking system can comprise: a base to position the arm on a support structure; an extension arm having a first end and a second end, the first end of the extension arm rotatably connected to the support structure or base at a first joint proximate the first end; and a lift arm having a third end and a fourth end, the third end rotatably connected to the extension arm at a second joint proximate the third end, the fourth end being height adjustable relative to the base. The arm locking system can have a first lock engageable to selectively prevent movement about the first joint; a second lock engageable to selectively prevent movement about the second joint; and a third lock engageable to selectively prevent a height of the fourth end from being adjusted relative to the base or extension arm, the first, second, and third locks being dependently actuateable and independently engageable.

In Example 2, the arm assembly of claim 1 can optionally be configured such that the base includes a generally cylindrical protrusion connected to or integral with the first end adapted to be rotatingly received within the support structure.

In Example 3, the arm assembly of any one or any combination of Examples 1-2 can optionally be configured such that the base includes a clamp.

In Example 4, the arm assembly of any one or any combination of Examples 1-3 can optionally be configured such that the support structure includes a cart.

In Example 5, the arm assembly of any one or any combination of Examples 1-4 can optionally be configured such that the support structure includes a desk.

In Example 6, the arm assembly of any one or any combination of Examples 1-5 can optionally be configured such that the extension arm rises from the base as it extends.

In Example 7, the arm assembly of any one or any combination of Examples 1-6 can optionally be configured such that the extension arm has a fixed height relative to the base.

In Example 8, the arm assembly of any one or any combination of Examples 1-7 can optionally be configured such that the lift arm includes a four-bar linkage.

In Example 9, the arm assembly of any one or any combination of Examples 1-8 can optionally be configured to further include a pan arm pivotally connected to the lift arm.

In Example 10, the arm assembly of any one or any combination of Examples 1-9 can optionally be configured such that the locking system is actuateable by an actuator operatively connected to a first engagement member of the first lock, a second engagement member of the second lock, and a third engagement member of the third lock.

In Example 11, the arm assembly of Example 10 can optionally be configured such that the first engagement member includes a first pin, the second engagement member includes a second pin, and the third engagement member includes a hook.

In Example 12, the arm assembly of Example 11 can optionally be configured such that the actuator is operatively connected to the second pin of the second lock by a connecting link.

In Example 13, an arm locking system can comprise: a lock linkage assembly engaging an extension arm at an actuator pivot point comprising: a pivoting member connected to an actuator, a first engagement member, a third engagement member, and a first linkage member, the first engagement member engaging a first lock, the third engagement member engaging a third lock; and a second linkage member connected to the first linkage member and a second engagement member, the second linkage member engaging the extension arm at a second lock pivot point, the second lock engagement member engaging a second lock; wherein the actuator can move the lock linkage assembly to a first position and a second position.

In Example 14, the arm locking system of Example 13 can optionally be configured such that when the lock linkage assembly is in the first position the first, second, and third locks are primed to lock and when the actuator is in the second position the first, second, and third locks are unlocked.

In Example 15, the arm assembly of any one or any combination of Examples 13-14 can optionally be configured to further comprise: a linkage biasing member connected to the pivoting member and the extension arm, wherein the actuator can be moved in one direction and the linkage biasing member biases the first lock, the second lock, and the third lock in a primed position and the actuator can be moved in the opposite direction and the linkage biasing member biases the first, second, and third locks in an unlocked position.

In Example 16, the arm assembly of any one or any combination of Examples 13-15 can optionally be configured such that at least one of the first lock engagement member and the second lock engagement member include a lock biasing member engaging a locking pin.

In Example 17, the arm assembly of any one or any combination of Examples 13-16 can optionally be configured such that the a second linkage member is configured in a v-shape having the first linkage member connected to a first linkage end of the second linkage member, the second engagement member connected to a second linkage end of the second linkage member and the second linkage member engaging the second lock pivot point near the middle of the v-shape.

In Example 18, the arm assembly of any one or any combination of Examples 13-17 can optionally be configured to further comprise: a base to position the arm on a support structure; an extension arm having a first end and a second end, the first end rotatably connected to the support structure or base at a first joint proximate the first end; and a lift arm having a third end and a fourth end, the third end rotatably connected to the extension arm at a second joint proximate the third end, the fourth end being height adjustable relative to the base.

In Example 19, the arm locking system of Example 18 can optionally be configured such that the first lock is engageable to selectively prevent movement about the first joint, the second lock is engageable to selectively prevent movement about the second joint; and the third lock is engageable to selectively prevent a height of the fourth end of the lift arm from being adjusted relative to the base or extension arm.

In Example 20 an arm assembly with an arm locking system, can comprise: a base to position the arm on a support structure; an extension arm having a first end and a second end, the first end rotatably connected to the support structure or base at a first joint proximate the first end; and a lift arm having a third end and a fourth end, the third end rotatably connected to the extension arm at a second joint proximate the third end, the fourth end being height adjustable relative to the base. The arm locking system can have a first lock engageable to selectively prevent movement about the first joint; a second lock engageable to selectively prevent movement about the second joint; a third lock engageable to selectively prevent a height of the fourth end from being adjusted relative to the base or extension arm. The first, second, and third locks can be dependently actuateable and independently engageable. The arm assembly can also comprise: a lock linkage assembly engaging the extension arm at a first lock pivot point comprising: a pivoting member connected to an actuator, a first lock engagement member, a third lock lever, and a first linkage member; a second linkage member connected to the first linkage member and a second lock engagement member, the second linkage member engaging the extension arm at a second lock pivot point; and a linkage biasing member connected to the pivoting member and the extension arm, wherein the actuator can be moved in one direction and the linkage biasing member biases the first, second, and third locks in a primed position and the actuator can be moved in the opposite direction and the linkage biasing member biases the first, second, and third locks in an unlocked position.

In Example 21, the arm assembly or apparatus of any one or any combination of Examples 1-20 can optionally be configured such that all elements, operations, or other options recited are available to use or select from.

BRIEF DESCRIPTION OF THE DRAWINGS

The following drawings are illustrative of particular examples of the present invention and therefore do not limit the scope of the invention. The drawings are not to scale (unless so stated) and are intended for use in conjunction with the explanations in the following detailed description. Examples of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
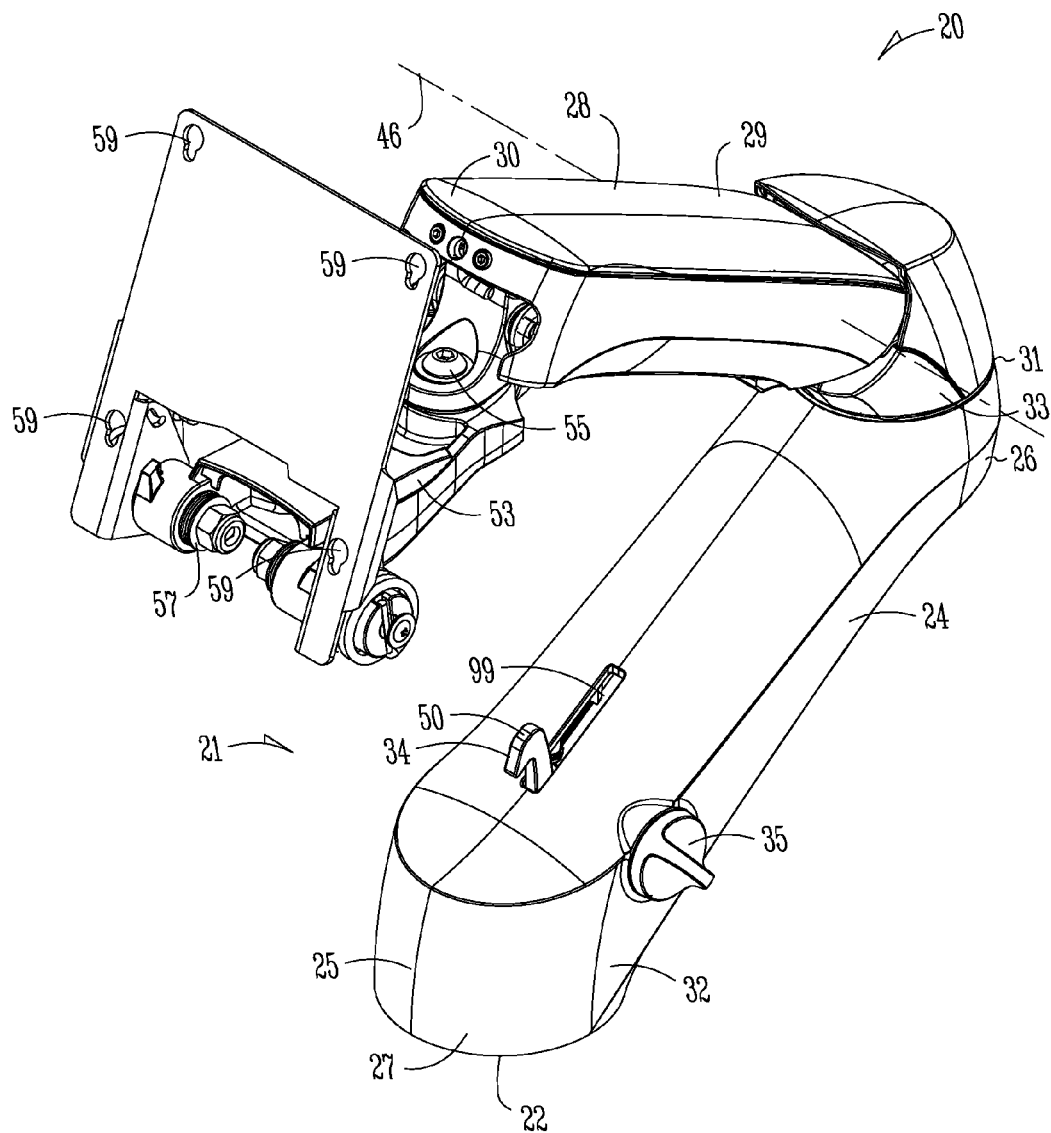
FIG. 1 is a front perspective view of an arm assembly with an arm locking system in a selectively unlocked configuration in accordance with an example of the invention.
Figure 2:
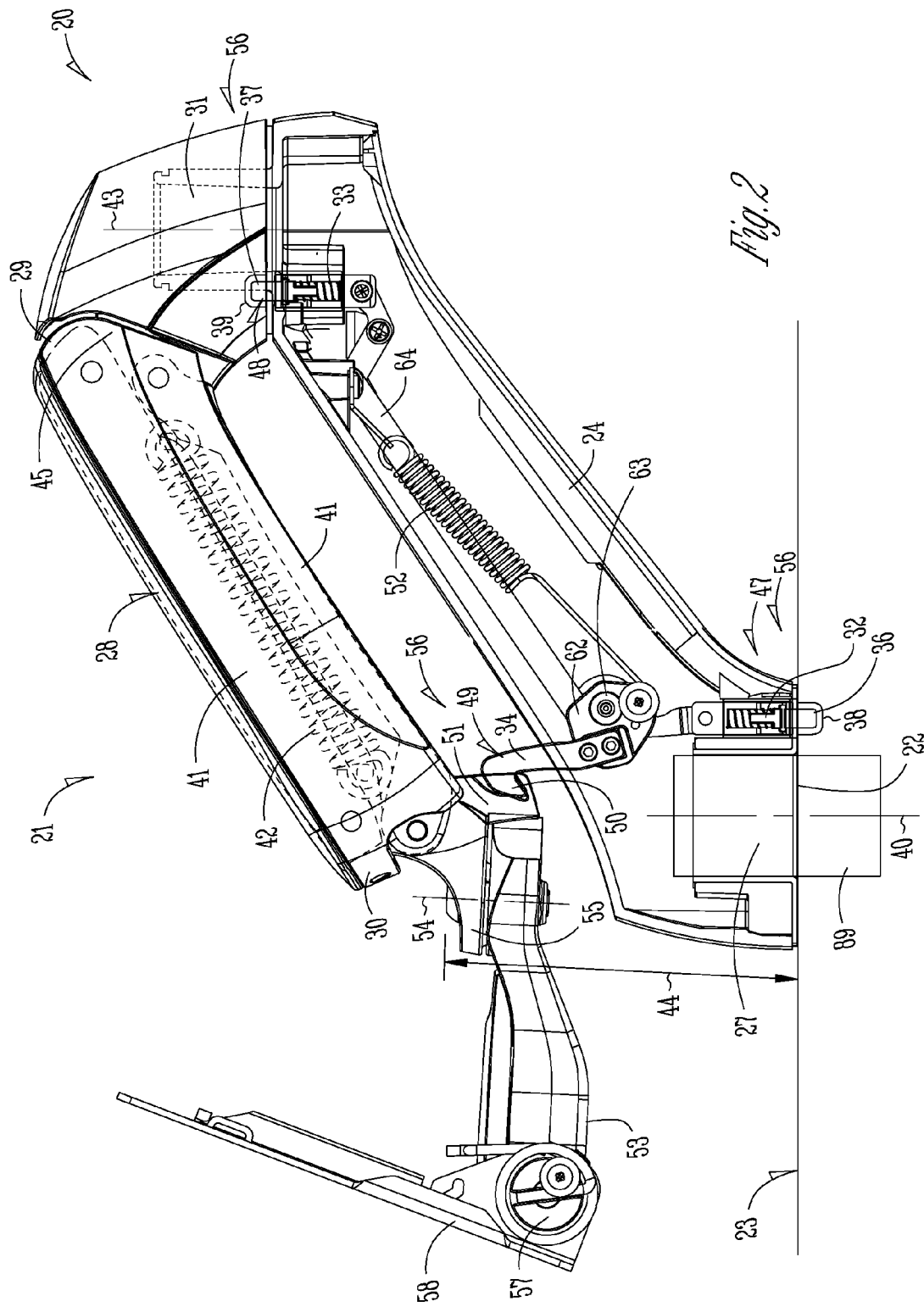
FIG. 2 is a side cut-away view of an arm assembly with an arm locking system in a selectively locked configuration in accordance with an example of the invention.

As shown in FIGS. 1 and 2, some example configurations include an arm assembly 20 with an arm locking system 21. The arm assembly 20 can be useful to position an electronic device, such as a flat panel display or tablet, at a desired position about a plurality of axes. In some example, the arm locking system 21 is useful for selectively locking the position of the arm assembly 20 about one, some, or all of the plurality of axes.

In the example shown, the arm assembly 20 includes a base 22 to position the arm assembly 20 on a support structure 23 (FIG. 2), and an extension arm 24 having a first end 25 proximate to the base 22 and a second end 26 opposite to the first end 25. The support structure 23 can be a cart, a desk, a table, a wall, or any structure with sufficient stability to support the arm assembly 20. The extension arm 24 is rotatably connected to the support structure 23 at a first joint 27 proximate the first end 25. In some examples, the first joint 27 is between the support structure 23 and the base 22. In other examples, the first joint 27 is between the extension arm 24 and the base 22. As shown, the arm assembly 20 can also include a lift arm 28 having a third end 29 and fourth end 30 and rotatably connected to the extension arm 24 at a second joint 31 proximate the first end 25, the fourth end 30 being height adjustable relative to the base 22.

In some examples, the arm assembly 20 includes an arm locking system 21 having a first lock 32 engageable to selectively prevent movement about the first joint 27, a second lock 33 engageable to selectively prevent movement about the second joint 31, and a third lock 34 engageable to selectively prevent a height 44 of the fourth end 30 of the lift arm 28 from being adjusted relative to the base 22 or extension arm 24. In some examples, the first lock 32 (also referred to as "lock 1"), second lock 33 (also referred to as "lock 2"), and third lock 34 (also referred to as "lock 3") are dependently actuateable and independently engageable.

In such examples, a user can actuate the first, second, and third locks at the same time, such as by actuating a single actuator 35 (e.g., a knob or lever). After actuation, the first, second, and third locks are primed to lock. The user can then independently engage one, some, or all of the first, second, and third locks to complete the locking function of each lock independently, as described further below.

The arm assembly 20 can include a single arm, double articulating arm, and/or any combination of extension and lift arms. In the example shown in FIGS. 1 and 2, the arm assembly 20 includes an extension arm 24 and a lift arm 28. The extension arm 24 can be rotationally coupled to the support structure 23 or base 22 at a first joint 27 that allows for rotational movement about a first generally vertical axis 40. The first joint 27 can allow a 360 degree rotation of the extension arm 24 around the first generally vertical axis 40. As shown, the extension arm 24 can rise from the base 22 as it extends. In certain examples, the extension arm 24 can have a fixed height relative to the base 22, such that its second end 26 is not height adjustable with respect to the base 22.

The lift arm 28 can include any structure that allows for height adjustment of at least the fourth end 30 of the lift arm 28 with respect to the base 22. In some examples, the lift arm 28 can include a four-bar linkage 41 with or without a counter-balancing spring 42 that pivots about a generally horizontal axis 46 of a lift joint 45. The lift arm 28 can be rotationally coupled to the extension arm 24 about a second joint 31 that allows for rotational movement about a second generally vertical axis 43. The second joint 31 can allow a 360 degree rotation of the lift arm 28 around the second generally vertical axis 43.

The arm locking system 21 can include any structure to lock the position (e.g., rotational position) of the extension arm 24 with respect to the support structure 23 and/or base 22, lock the position (e.g., rotational position) of the lift arm 28 with respect to the extension arm 24, and lock the position (e.g., pivotable height position) of the fourth end 30 of the lift arm 28 with respect to the extension arm 24 and/or base 22.

Figure 3:
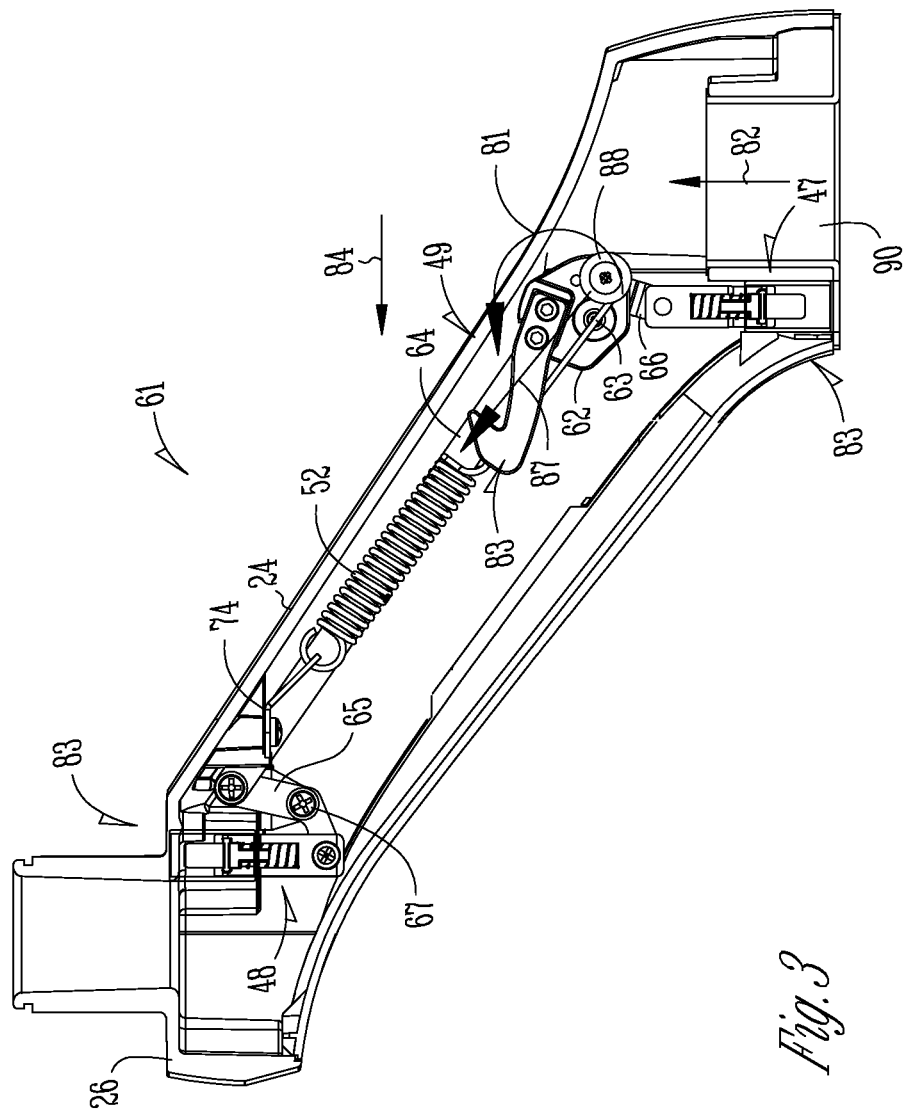
FIG. 3 is a close up side cut away view with an arm locking system in a selectively unlocked configuration in accordance with an example of the invention.

Referring to FIGS. 1-3, in some examples, the arm locking system 21 can be actuateable by an actuator 35 (e.g., knob) operatively connected to a pivoting member 62, a first engagement member 47 of the first lock 32, a second engagement member 48 of the second lock 33, and a third engagement member 49 of the third lock 34.

In certain example configurations, the first engagement member 47 of the first lock 32 can include a first pin 36 adapted to be received within a first pin receiving aperture 38 located in the base 22 or support structure 23. The second engagement member 48 of the second lock 33 can include a second pin 37 adapted to be received within a second pin receiving aperture 39 located in the lift arm 28. The lift arm 28 or the support structure 23 (or base 22) can include more than one pin receiving aperture and the extension arm 24 and/or lift arm 28 can be locked in more than one position. The third engagement member 49 of the third lock 34 can be a hook 50 (e.g., carried by the base 22 or proximate the first end 25 of the extension arm 24) adapted to mate with a hook receiver 51 (e.g., proximate the fourth end 30 of the lift arm 28). The hook receiver 51 can be any type of latching structure configured to secure and latch the third engagement member 49. Further, the engagement members can be connected to the actuator 35 by any suitable structure, such as through one or more articulating connecting links, optionally biased by a linkage biasing member 52.

In some examples, actuation of the actuator 35 (e.g., turning the knob) can actuate all three locks 32, 33, 34 such that they are primed to engage and will lock when certain positioning criteria have been met. In the examples described above, actuating the actuator 35 can bias first and second pins 36, 37 of the first and second locks 32, 33 towards engagement with their respective first and second pin receiving apertures 38, 39. The first pin 36 of the first lock 32 can only engage with the first pin receiving aperture 38 of the first lock 32 when the extension arm 24 is in a selected, pre-defined rotational orientation with respect to the support structure 23 or base 22. In such an example, after actuation of the arm locking system 21, the extension arm 24 can be rotated about the first joint 27 until the first pin 36 and first pin receiving aperture 38 align to thereby engage the first lock 32. It should be noted the first lock 32 may simultaneously actuate and engage if the extension arm 24 is in the proper rotational alignment with respect to the support structure 23 or base 22 when the arm locking system 21 is actuated.

Likewise, in some examples, the second pin 37 of the second lock 33 can only engage with the second pin receiving aperture 39 of the second lock 33 when the lift arm 28 is in a selected, pre-defined rotational orientation with respect to the extension arm 24. In such an example, after actuation of the arm locking system 21, the lift arm 28 can be rotated about the second joint 31 until the second pin 37 and second pin receiving aperture 39 of the second lock 33 align to thereby engage the second lock 33. In some examples, this rotational alignment will vertically align the extension arm 24 and the lift arm 28. It should be noted the second lock 33 may simultaneously actuate and engage if the lift arm 28 is in the proper rotational alignment with respect to the extension arm 24 when the arm locking system 21 is actuated.

Also in the examples described above, actuating the actuator 35 can position the hook 50 of the third lock 34 to engage with the hook receiver 51, such as by extending the hook 50 upward out an opening such as slot 99 in the base 22 or extension arm 24. In some examples, the hook 50 of the third lock 34 can only engage with the hook receiver 51 of the third lock 34 when the fourth end 30 of the lift arm 28 is in a selected, pre-defined vertical orientation with respect to the support structure 23, base 22 or extension arm 24. In such an example, after actuation of the arm locking system 21, the lift arm 28 can be pivoted about the generally horizontal axis 46 of the lift joint 45 until the hook 50 and hook receiver 51 engage to thereby engage the third lock 34. In some examples, as shown, this can be at the lift arm's 28 lowest position. It should be noted the third lock 34 may simultaneously actuate and engage if the fourth end 30 of the lift arm 28 is in the proper vertical height position with respect to the extension arm 24 or base 22 when the arm locking system 21 is actuated.

Accordingly, in some examples, the first, second, and third locks are dependently actuateable and independently engageable. Hence, arm assemblies 20 with arm locking systems 21 in accordance with examples of the invention allow for several locking sequences and combinations, such as: locks 1-2-3, locks 2-1-3, locks 2-3-1, locks 1-2, locks 2-3, lock 1, and lock 2. These multiple locking combinations can increase usability by not requiring perfect alignment of the various arm assembly components before actuation of the locking system. Rather, the locks can be actuated when the arm assembly components are in any position, and the locks can then be independently engaged by moving the various arm assembly components into proper alignment as described above.

The arm assembly 20 can also provide other adjustable components. For example, as shown in FIG. 2, some examples of the arm assembly include a hook receiver pivotally connected to the fourth end 30 of the lift arm 28. As shown, an interface plate 58, such as a plate including a VESA compliant hole pattern 59, can be carried by the pan arm 53 to connect to the electronic device. In such examples, the pan arm 53 can pivot with respect to the fourth end 30 of the lift arm 28 about a generally third vertical axis 54 at a third joint 55 to allow for panning of an electronic device connected to the interface plate 58. In certain examples, the pan arm 53 can pan about the third generally vertical axis 54 of the third joint 55 regardless of whether any, some, or all of the first lock 32, second lock 33, and third lock 34 are engaged in a locked position 56. In such examples, the third lock 34 is on the lift arm side of the third joint 55.

Also as shown in FIG. 2, in some examples, a tilt mechanism 57 can be provided between the interface plate 57 and the pan arm 53 to allow an electronic device 60 (see FIGS. 7 and 8) connected to the interface plate 58 to tilt about a generally horizontal axis. In certain examples, the tilt mechanism 57 allows for motion about the generally horizontal axis regardless of whether any, some, or all of the first, second, and third locks are engaged in the locked position 56.

Figure 4:
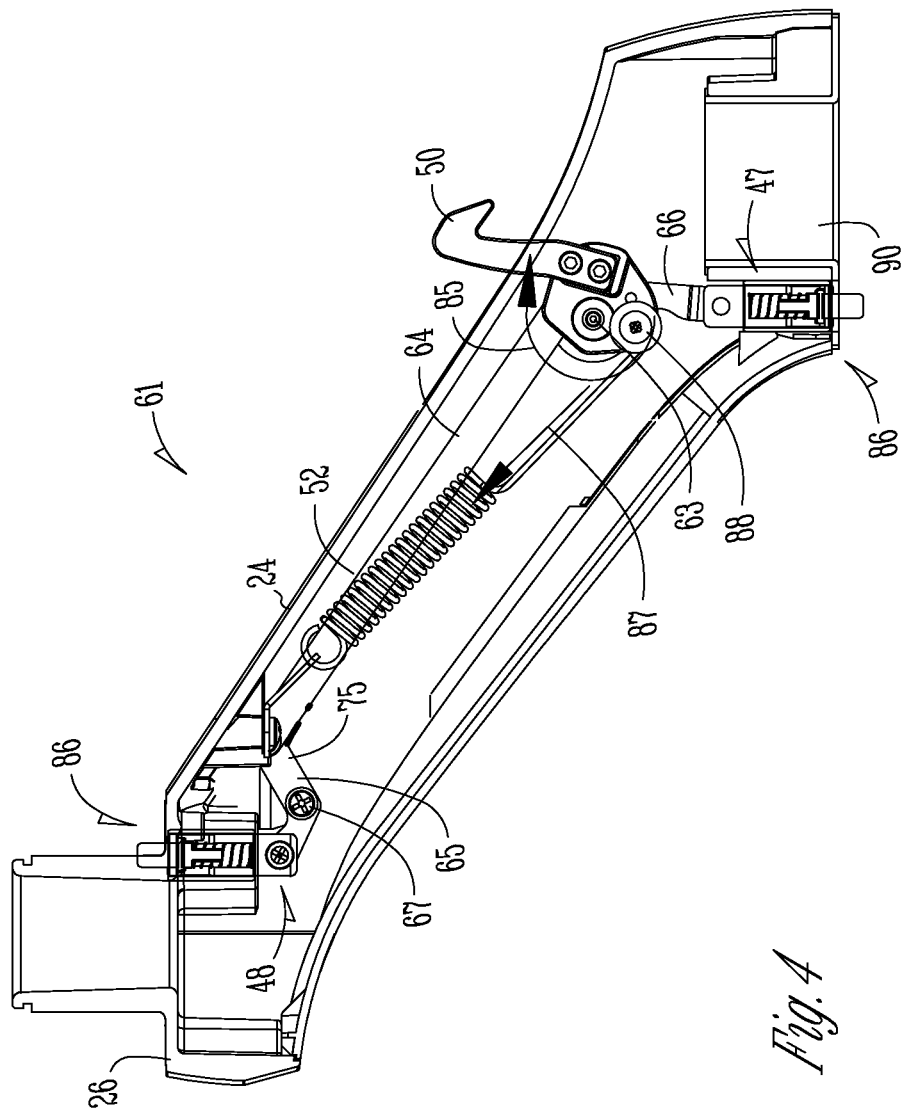
FIG. 4 is a close up side cut away view with an arm locking system in a selectively locked configuration in accordance with an example of the invention.
Figure 5:
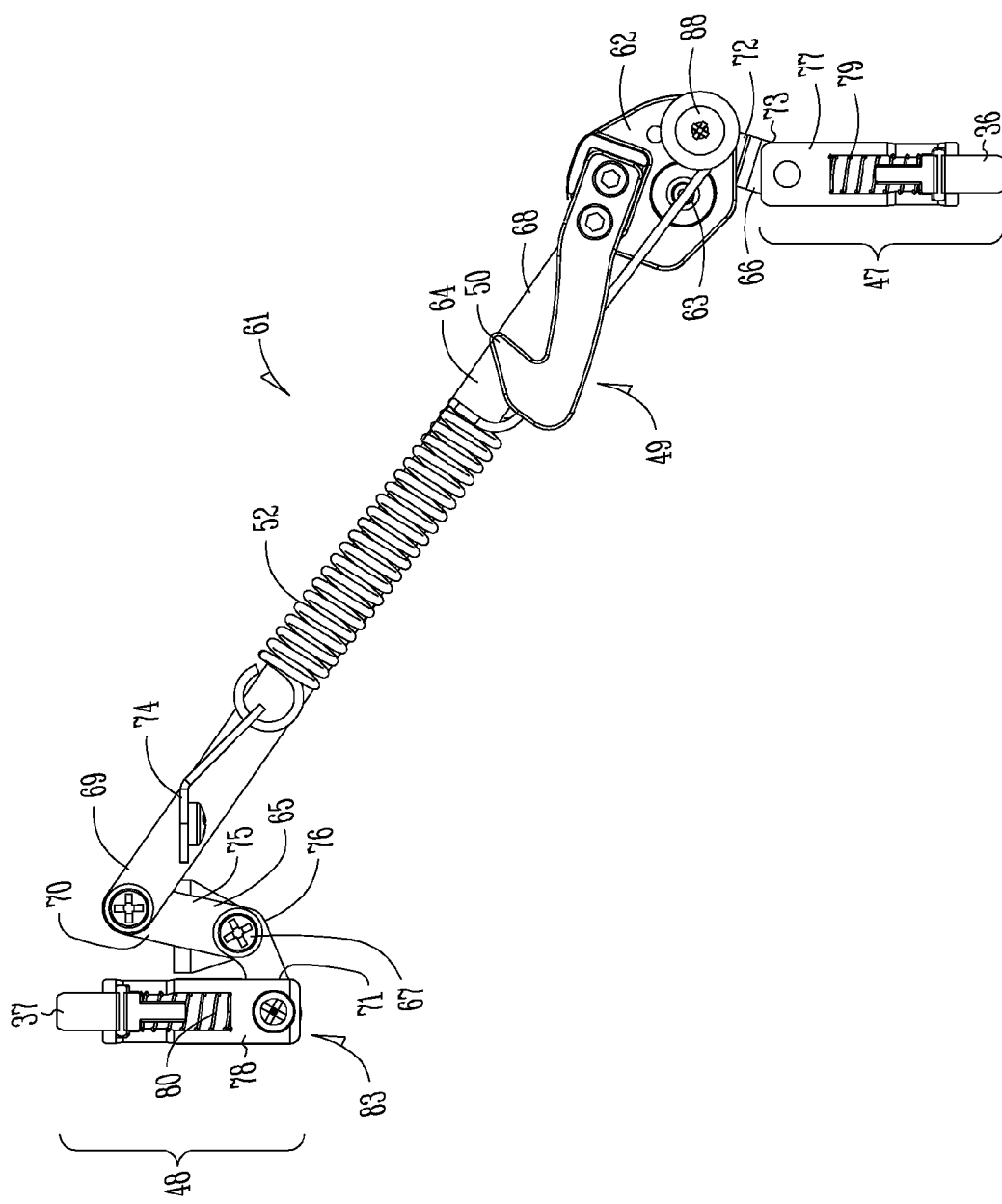
FIG. 5 is a close up view of the locking linkage of FIG. 3, in accordance with an example of the invention.
Figure 6:
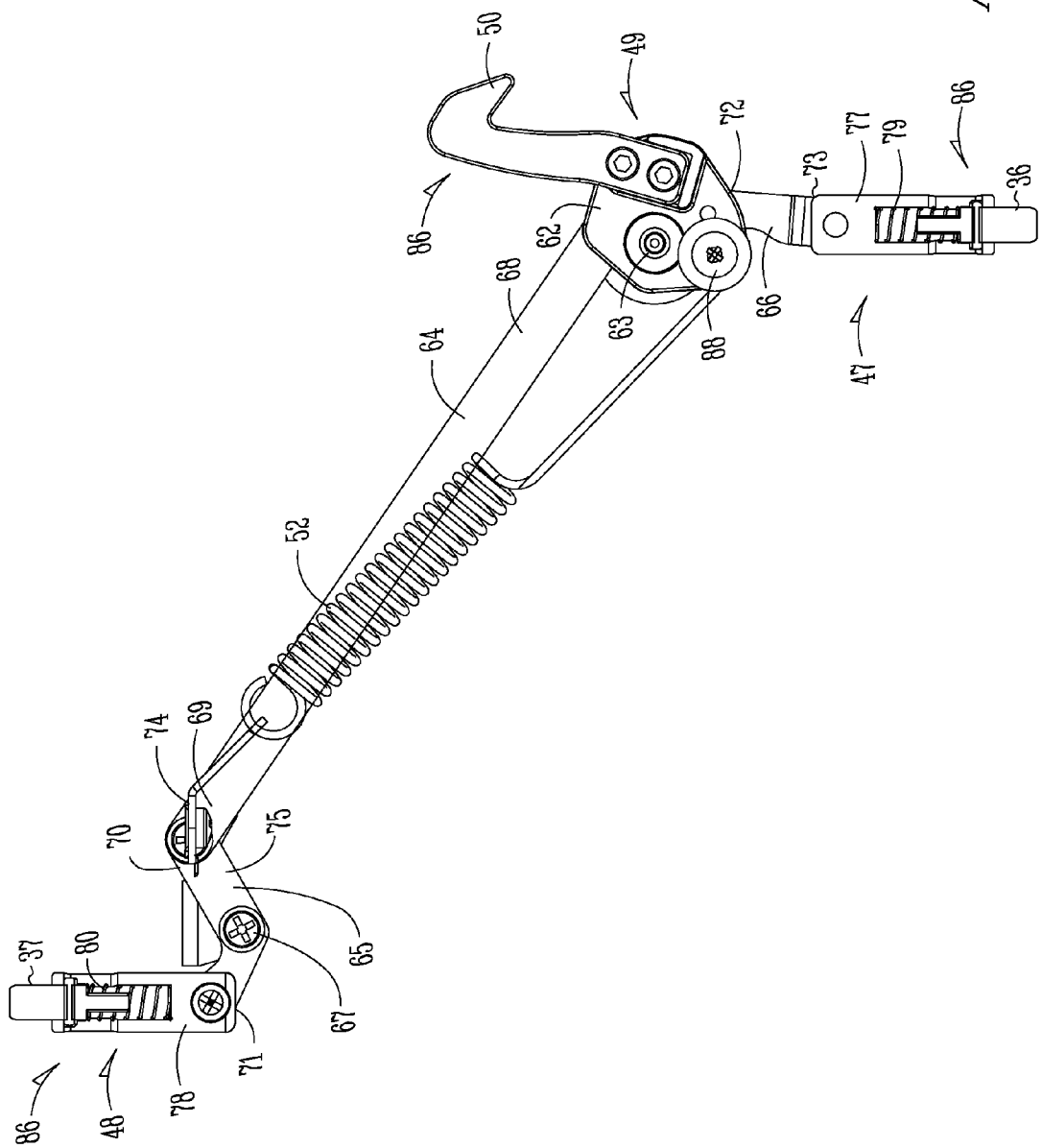
FIG. 6 is a close up view of the locking linkage of FIG. 4, in accordance with an example of the invention.

FIGS. 3-6 illustrate closer views of examples of a lock linkage assembly 61 in an unlocked position 83 (FIGS. 3 and 5) and a primed or ready-to-lock position 86 (FIGS. 4 and 6). The lock linkage assembly 61 can include a pivoting member 62, an actuator pivot point hereinafter referred to as a first pivot point 63, a first linkage member 64, a second linkage member 65, a short linkage member 66, a linkage biasing member 52, a second lock pivot point 67, a first engagement member 47, a second engagement member 48, and a third engagement member 49. The lock linkage assembly 61 can include fasteners, attach points, counterbalances, and other structures as needed.

The first linkage member 64 can extend from a first link first end 68 to a first link second end 69. The second linkage member can extend from a second link first end 70 to a second link second end 71. The short linkage member 66 can extend from an short link first end 72 to an short link second end 73.

The pivoting member 62 can be connected to an actuator 35 (see FIG. 1). The pivoting member 62 can rotate about the first pivot point 63 which can be supported by the extension arm 24. The pivoting member can be connected to the first link first end 68, the linkage biasing member 52, a short linkage member 66 at the short link first end 72, and the third engagement member 49. The linkage biasing member 52 can be a spring, a rubber strap, a gas cylinder, or other elastomeric device. One end of the linkage biasing member 52 can be attached to the pivoting member 62 and the other end can be secured to a bracket 74 which can be attached to the extension arm 24. The first link second end 69 of the first linkage member 64 can be movably attached to the second link first end 70 of the second linkage member 65. The second linkage member 65 can include a v-shape 75 and can be movably attached to the second lock pivot point 67 near a middle point 76 of the v-shape 75. The second link second end 71 of the second linkage member 65 can be attached to the second engagement member 48. The short link second end 73 of the short linkage member 66 can be attached to the first engagement member 47.

The first and second engagement members 47, 48 can include a first and second carrier members 77, 78, a first and second locking pin 36, 37, and a first and second lock biasing member 79, 80. The third engagement member 49 can include a hook 50.

In operation, the actuator 35 can turn the pivoting member 62 in one direction such as a counterclockwise direction 81 as shown in FIG. 3. The first linkage member 64 can be pushed towards the second end 26 as the short linkage member 66 is pulled in an upward direction 82 to an unlocked position 83. The third engagement member 49 can be simultaneously rocked in a rearward direction 84 to an unlocked position 83. As the first linkage member 64 is pushed towards the second end 26, the second link first end 70 of the second linkage member 65 is also pushed towards the second end 26. The second lock pivot point 67 in the middle point 76 of the second linkage member 65 causes the second link second end 71 to move in the opposite direction which can cause the second engagement assembly to lower to an unlocked position 83.

In FIG. 4, the pivoting member 62 can be rotated in the opposite direction or a clockwise direction 85 as shown. The linkages can operate in the opposite manner and the first engagement member 47, the second engagement member 48 and the third engagement member 49 can be placed in a primed or ready-to-lock position 86. The support structure 23, base 22, and a lower surface of the third end 29 of the lift arm 28 can include one or more pin apertures such as the first pin receiving aperture 38 or second pin receiving aperture 39 (see FIG. 2). When either the first joint 27 or the second joint 31 is rotated to a position where the ready-to lock engagement member is over a pin aperture, the lock biasing element (79, 80) can push the pin into the pin aperture. The third engagement member 49 can be configured so that the third lock 34 can engage when the lift arm 28 has been lowered and the lift arm 28 has been rotated to a position over the extension arm 24.

As shown in FIGS. 3 and 5, the linkage biasing member 52 can be configured so that the biasing direction 87 (e.g. towards the second end 26) can bias the first, second and third engagement members 47, 48, 49, in an unlocked position 83 when the pivoting member 62 is turned in one direction. As shown in FIGS. 4 and 6 the attach point 88 of the linkage biasing member 52 on the pivoting member 62 can cause the linkage biasing member to be on the other side of the center of the first pivot point 63, when the actuator 35 has been rotated in the other direction to effectively biasing the first, second and third engagement members 47, 48, 49, in a primed or ready-to-lock position 86.

Figure 7:
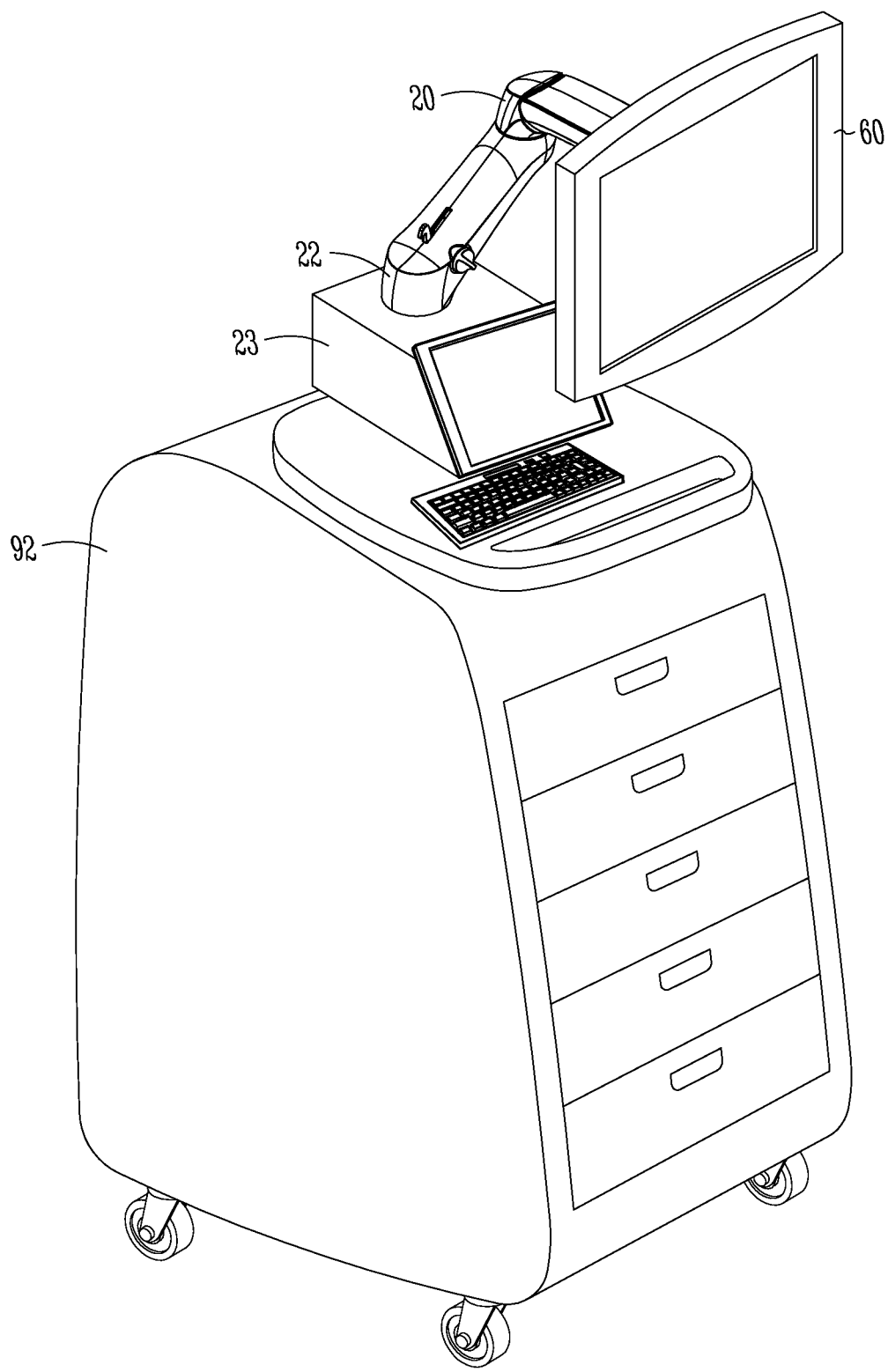
FIG. 7 is a front perspective view of an electronic device mounted to an arm assembly with an arm locking system in accordance with an example of the invention mounted to a cart.
Figure 8:
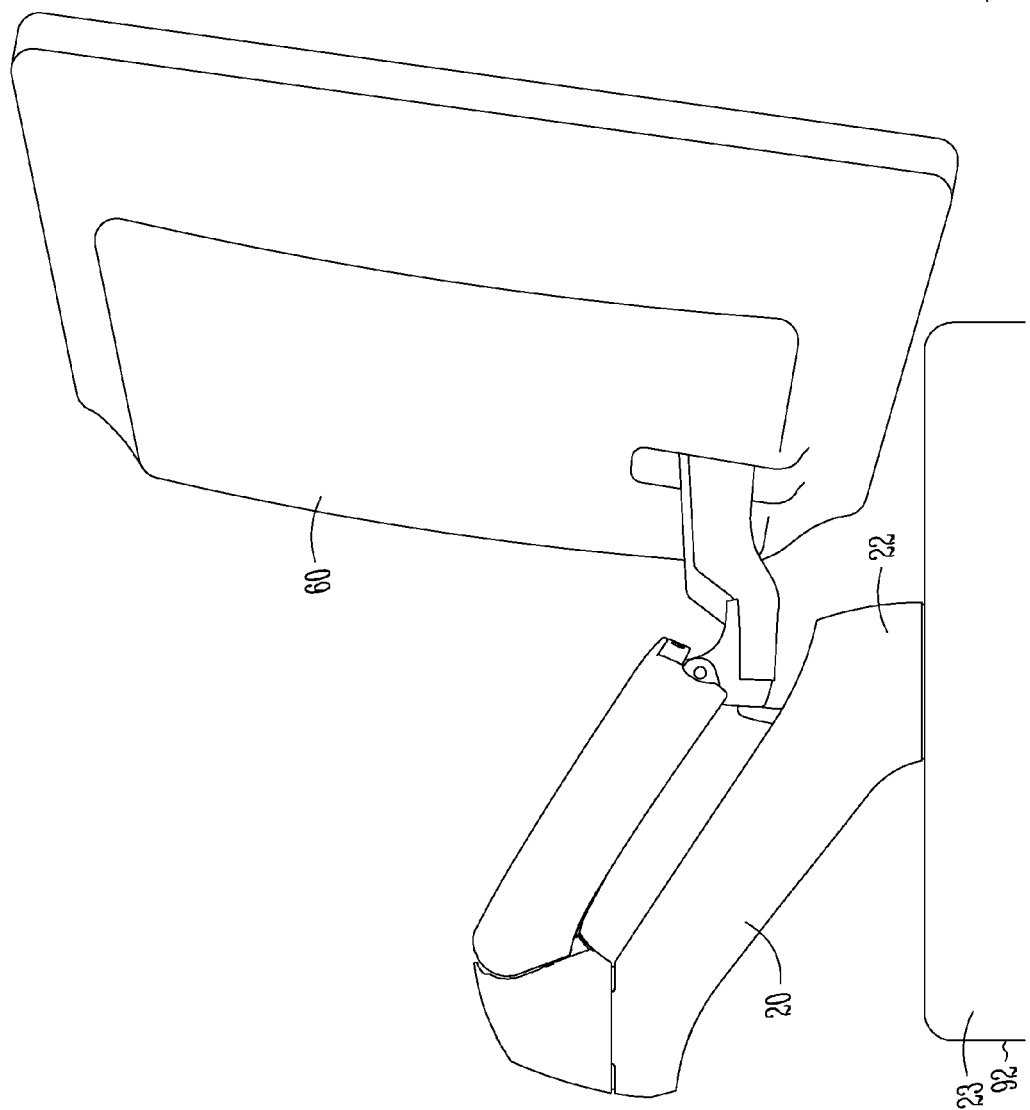
FIG. 8 is a side perspective view of an electronic display and an arm assembly with an arm locking system in accordance with an example of the invention mounted to a cart.

The base 22 can include any structure useful for supporting the arm assembly 20 on a support structure 23. In some examples, the base 22 can include a generally cylindrical protrusion 89 (see FIG. 2) connected to or integral with the first end 25 of the extension arm 24 adapted to be rotatingly received within the support structure 23. As shown, the extension arm 24 can include a female cavity 90 for engagement with the generally cylindrical protrusion 89 that can be integral with the base 22, the support structure 23, or the generally cylindrical protrusion 89 can be a separate component. In some examples, as shown in FIGS. 7 and 8, the support structure 23 can include a cart 92 (e.g., a transportable cart having a base with one or more wheels). As shown in FIGS. 7 and 8 the arm assembly 20 can include a base 22 and an electronic device 60 such as a display unit.

Figure 9:
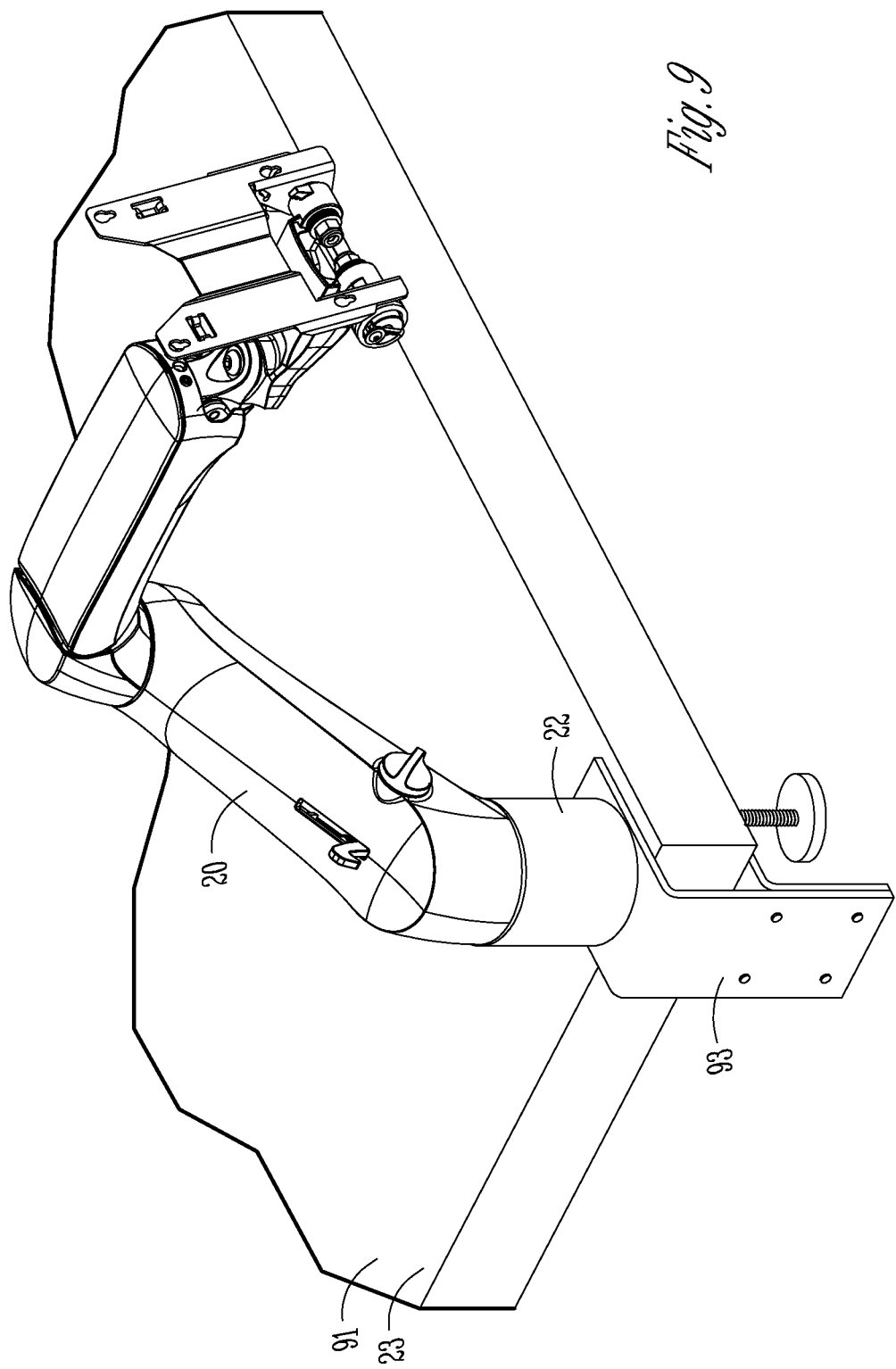
FIG. 9 is a front perspective view of an electronic display and an arm assembly with an arm locking system in accordance with an example of the invention mounted to a desk.
Figure 10:
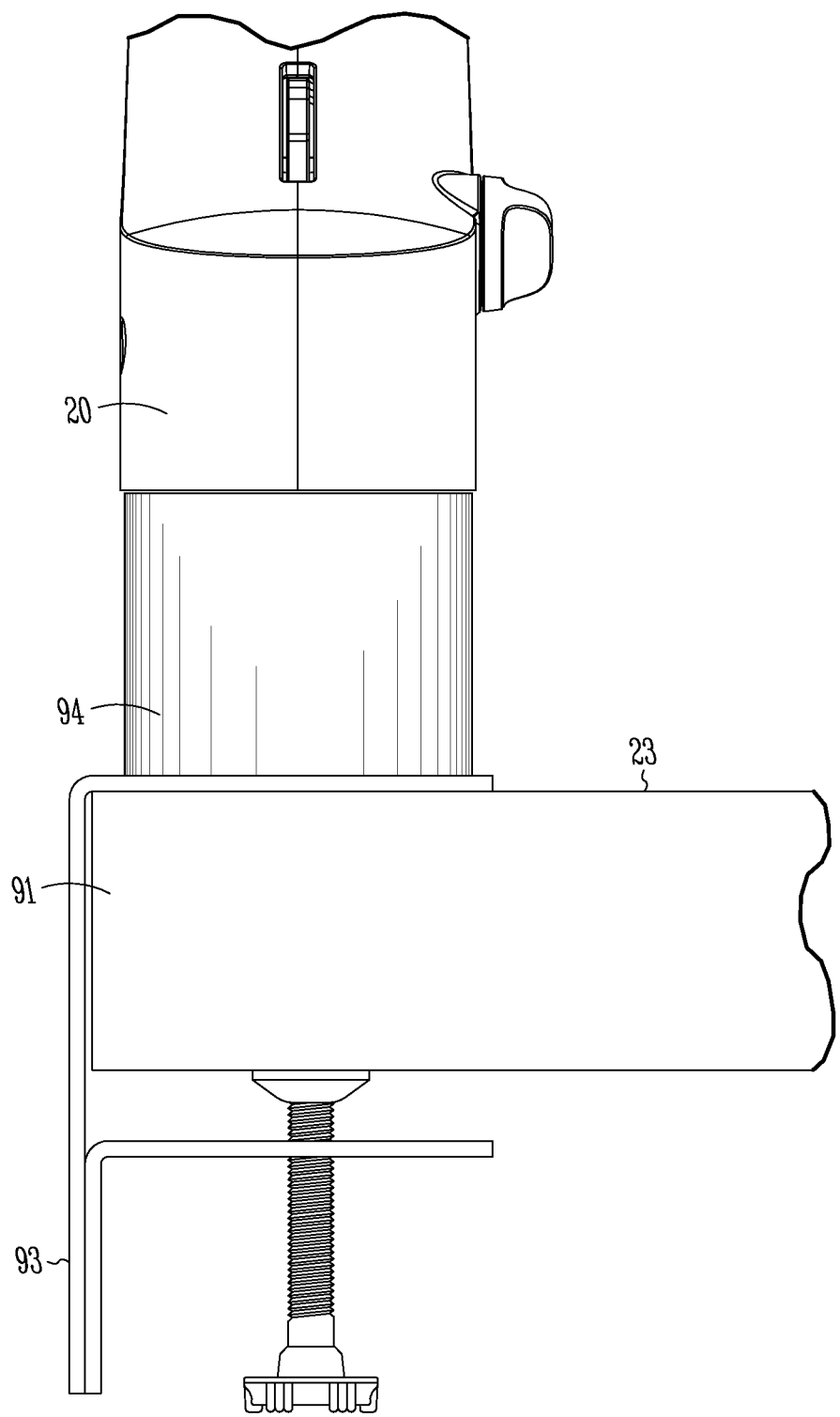
FIG. 10 is a side perspective view of a base of an arm assembly with an arm locking system in accordance with an example of the invention mounted to a desk.

FIGS. 9 and 10 illustrate examples in which the base 22 can include a clamp 93, either to clamp to an edge of the support structure 23 or within a grommet of a support structure 23. The support structure 23 itself can include any structure useful for receiving or supporting the base 22, such as a base receiving aperture 94 to rotatingly receive the base 22 or an edge or grommet for a clamp 93. In other examples, as shown in FIGS. 9 and 10, the support structure 23 includes a horizontal work surface 91 (e.g., a desk or table top).

Figure 11:
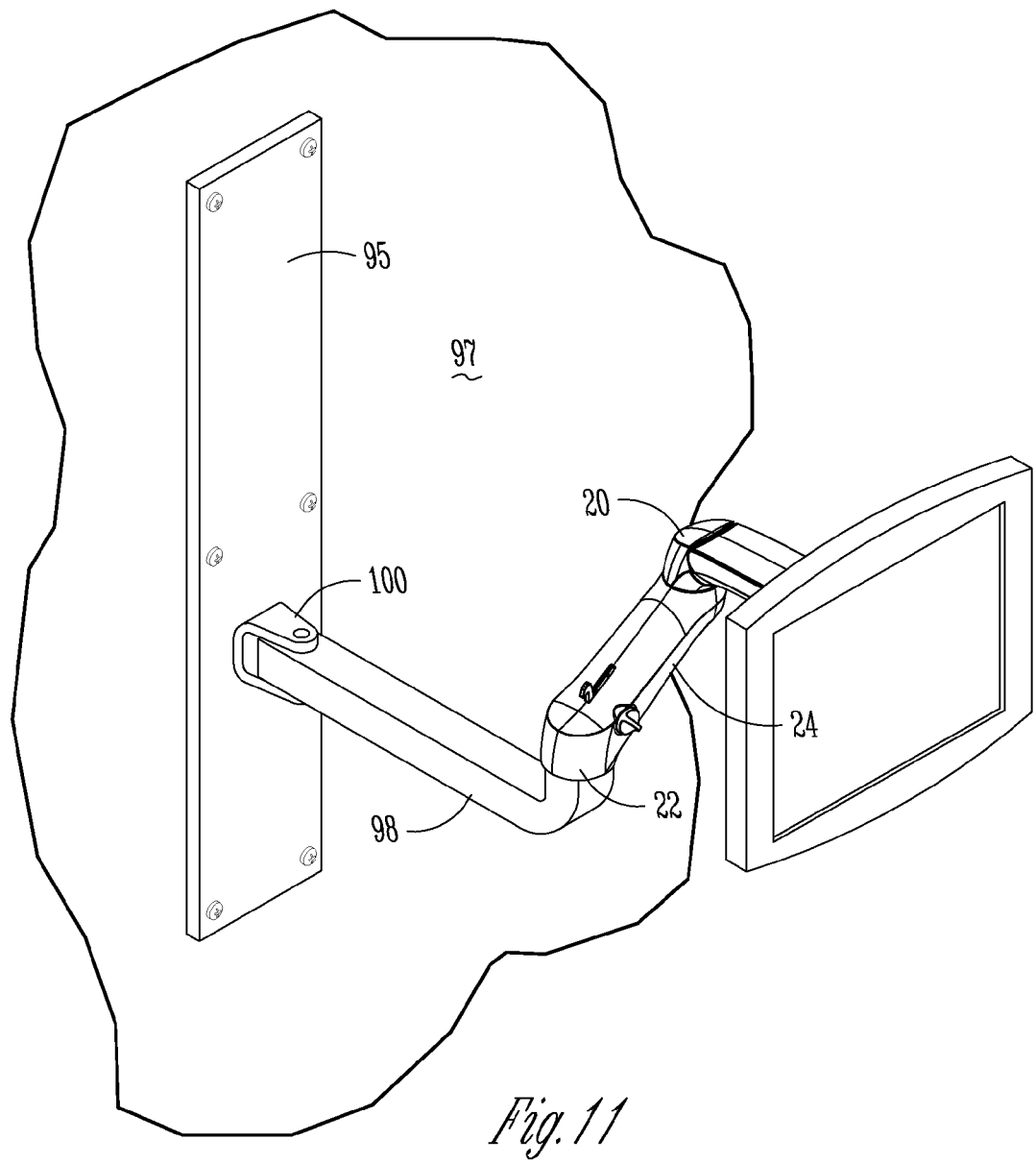
FIG. 11 is a side perspective view of an arm assembly with an arm locking system in accordance with an example of the invention mounted to a wall.

In yet other examples, as shown in FIG. 11, the support structure 23 can include a wall plate 95 for attaching to vertical surface 97, such as a wall. FIG. 11 illustrates an arm assembly 20 having an additional arm 98 that is rotatably attached to the extension arm 24. The wall plate 95 can include an additional rotation joint at a wall plate base 100.

Examples of the invention also include methods of locking an arm assembly with an arm locking system, such as with any of the arm locking systems described herein. In some examples, the method includes one or more steps of: actuating an actuator (e.g., rotating a knob counter-clockwise) to engage the locks; rotating the extension arm until it reaches its pre-selecting position, when reaching the position, an engagement member (e.g. pin) will engage to lock the extension arm rotation relative to the support structure and/or base (lock 1); rotating the lift arm to its preselected position (e.g., parallel to and above the extension arm), an engagement member (e.g., pin) will engage between the arms (lock 2); and lowering the lift arm until it engages the engagement member (e.g., hook) on the extension arm or base (lock 3). An electronic device may also be panned or tilted relative to the base.

Thus, examples of the invention are disclosed. Although the present invention has been described in considerable detail with reference to certain disclosed examples, the disclosed examples are presented for purposes of illustration and not limitation and other examples of the invention are possible. One skilled in the art will appreciate that various changes, adaptations, and modifications may be made without departing from the spirit of the invention.

The above Detailed Description includes references to the accompanying drawings, which form a part of the Detailed Description. The drawings show, by way of illustration, specific examples in which the present insert press and method can be practiced. These examples are also referred to herein as "examples."

The above Detailed Description is intended to be illustrative, and not restrictive. For example, the above-described examples (or one or more elements thereof) can be used in combination with each other. Other examples can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description, with each claim standing on its own as a separate example. The scope of the invention should be determined with reference to the appended claims, along with the full scope of equivalents to which such claims are entitled.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "about" and "approximately" are used to refer to an amount that is nearly, almost, or in the vicinity of being equal to a stated amount. In this document, the term "patient" is intended to include mammals, such as for human applications or veterinary applications.

In the appended claims, the terms "including" and "in which" are used as the plain-English equivalents of the respective terms "comprising" and "wherein." Also, in the following claims, the terms "including" and "comprising" are open-ended, that is, an assembly, system, or method that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to quickly ascertain the nature of the technical disclosure. It is submitted with the understanding that it will not be used to interpret or limit the scope or meaning of the claims.

What is claimed:

1. An arm assembly with an arm locking system, comprising:
    a base to position the arm assembly on a support structure;
    an extension arm having a first end and a second end, the first end of the extension arm rotatably connected to the support structure or base at a first joint proximate the first end;
    a lift arm having a third end and a fourth end, the third end rotatably connected to the extension arm at a second joint proximate the third end, the fourth end being height adjustable relative to the base; and
    the arm locking system actuateable by a rotatable actuator on the extension arm, the arm locking system having:
    a first lock engageable to selectively prevent movement about the first joint;
    a second lock engageable to selectively prevent movement about the second joint; and
    a third lock engageable to selectively prevent a height of the fourth end from being adjusted relative to the base or extension arm, the first, second, and third locks being dependently actuateable and independently engageable.

2. The arm assembly of claim 1, wherein the base includes a generally cylindrical protrusion connected to or integral with the first end adapted to be rotatingly received within the support structure.

3. The arm assembly of claim 1, wherein the base includes a clamp.

4. The arm assembly of claim 1, wherein the support structure includes a cart.

5. The arm assembly of claim 1, wherein the support structure includes a desk.

6. The arm assembly of claim 1, wherein the extension arm rises from the base as it extends.

7. The arm assembly of claim 1, wherein the extension arm has a fixed height relative to the base.

8. The arm assembly of claim 1, wherein the lift arm includes a four-bar linkage.

9. The arm assembly of claim 1, further including a pan arm pivotally connected to the lift arm.

10. The arm assembly of claim 1, wherein the actuator is operatively connected to a first engagement member of the first lock, a second engagement member of the second lock, and a third engagement member of the third lock.

11. The arm assembly of claim 10, wherein the first engagement member includes a first pin, the second engagement member includes a second pin, and the third engagement member includes a hook.

12. The arm assembly of claim 11, wherein the actuator is operatively connected to the second pin of the second lock by a connecting link.

13. An arm locking system comprising:
a lock linkage assembly engaging an extension arm at an actuator pivot point comprising:
a pivoting member connected to an actuator, a first engagement member, a third engagement member, and a first linkage member, the first engagement member engaging a first lock, the third engagement member engaging a third lock; and
a second linkage member rotatingly coupled to the first linkage member and a second engagement member, the second linkage member engaging the extension arm at a second lock pivot point, the second engagement member engaging a second lock; wherein the actuator can move the lock linkage assembly to a first position and a second position; and
a linkage biasing member connected to the pivoting member and the extension arm, wherein the actuator can be moved in one direction and the linkage biasing member biases the first lock, the second lock, and the third lock in a primed position and the actuator can be moved in the opposite direction and the linkage biasing member biases the first, second, and third locks in an unlocked position.

14. The arm locking system of claim 13, wherein when the lock linkage assembly is in the first position the first, second, and third locks are primed to lock and when the actuator is in the second position the first, second, and third locks are unlocked.

15. The arm locking system of claim 13, wherein at least one of the first engagement member and the second engagement member include a lock biasing member engaging a locking pin.

16. The arm locking system of claim 13, wherein the a second linkage member is configured in a v-shape having the first linkage member connected to a first linkage end of the second linkage member, the second engagement member connected to a second linkage end of the second linkage member and the second linkage member engaging the second lock pivot point near the middle of the v-shape.

17. The arm locking system of claim 13 further comprising:
a base to position the arm on a support structure;
the extension arm having a first end and a second end, the first end rotatably connected to the support structure or base at a first joint proximate the first end; and
a lift arm having a third end and a fourth end, the third end rotatably connected to the extension arm at a second joint proximate the third end, the fourth end being height adjustable relative to the base.

18. The arm locking system of claim 17, wherein the first lock is engageable to selectively prevent movement about the first joint, the second lock is engageable to selectively prevent movement about the second joint; and the third lock is engageable to selectively prevent a height of the fourth end of the lift arm from being adjusted relative to the base or extension arm.

19. An arm assembly with an arm locking system, comprising:
a base to position the arm assembly on a support structure;
an extension arm having a first end and a second end, the first end rotatably connected to the support structure or base at a first joint proximate the first end;
a lift arm having a third end and a fourth end, the third end rotatably connected to the extension arm at a second joint proximate the third end, the fourth end being height adjustable relative to the base; and
the arm locking system having a first lock engageable to selectively prevent movement about the first joint;
a second lock engageable to selectively prevent movement about the second joint;
a third lock engageable to selectively prevent a height of the fourth end from being adjusted relative to the base or extension arm, the first, second, and third locks being dependently actuateable and independently engageable;
a lock linkage assembly engaging the extension arm at a first lock pivot point comprising:
a pivoting member connected to an actuator, a first lock engagement member, a third lock lever, and a first linkage member;
a second linkage member connected to the first linkage member and a second lock engagement member, the second linkage member engaging the extension arm at a second lock pivot point; and
a linkage biasing member connected to the pivoting member and the extension arm, wherein the actuator can be moved in one direction and the linkage biasing member biases the first, second, and third locks in a primed position and the actuator can be moved in the opposite direction and the linkage biasing member biases the first, second, and third locks in an unlocked position.

20. An arm assembly with an arm locking system, comprising:
a base to position the arm assembly on a support structure;
an extension arm having a first end and a second end, the first end of the extension arm rotatably connected to the support structure or base at a first joint proximate the first end;
a lift arm having a third end and a fourth end, the third end rotatably connected to the extension arm at a second joint proximate the third end, the fourth end being height adjustable relative to the base; and
the arm locking system having a first lock engageable to selectively prevent movement about the first joint, the first lock having a first engagement member;
a second lock engageable to selectively prevent movement about the second joint, the second lock having a second engagement member; and
a third lock engageable to selectively prevent a height of the fourth end from being adjusted relative to the base or extension arm, the third lock having a third engagement member, the first, second, and third locks being dependently actuateable and independently engageable,
wherein the locking system is actuateable by an actuator operatively connected to a first engagement member of the first lock, a second engagement member of the second lock, and a third engagement member of the third lock.

* * * * *